United States Patent [19]

Edwards

[11] Patent Number: 5,268,230

[45] Date of Patent: Dec. 7, 1993

[54] EXTRUSION COATING PROCESS FOR PRODUCING A HIGH GLOSS POLYETHYLENE COATING

[75] Inventor: Ray Edwards, Henderson, Tex.

[73] Assignee: Eastman Kodak Company, Rochester, N.Y.

[21] Appl. No.: 843,043

[22] Filed: Feb. 28, 1992

[51] Int. Cl.$^5$ .............................................. B32B 15/08
[52] U.S. Cl. .................. 428/409; 428/411.1; 428/500
[58] Field of Search ............... 428/500, 411.1, 409, 428/349, 218, 516, 517

[56] References Cited

U.S. PATENT DOCUMENTS 4,287,262  9/1981  Engelhard ........................ 428/523
5,080,954  1/1992  Mackey, Sr. ...................... 428/500

Primary Examiner—Patrick J. Ryan
Assistant Examiner—W. Krynski
Attorney, Agent, or Firm—Mark A. Montgomery; William P. Heath, Jr.

[57] ABSTRACT

A process of producing a high gloss oxidizable extrusion coated polyethylene is provided. This process entails extrusion coating a low density polyethylene of narrow molecular weight distribution having a low melt index, a low swell ratio, and a polydispersity index below 9.

9 Claims, No Drawings

EXTRUSION COATING PROCESS FOR PRODUCING A HIGH GLOSS POLYETHYLENE COATING

FIELD OF THE INVENTION

The present invention relates to a process for extrusion coating polyethylene to produce a high gloss coating. More particularly the present invention relates to a process for producing polyethylene coatings of high gloss that are oxidizable.

BACKGROUND OF THE INVENTION

Polypropylenes are used in (co)extrusion coating applications primarily for their resistance to permeation by oils and fats and/or for their high gloss surface finish. The use of polypropylenes for high gloss extrusion coatings is well known. The unique high gloss characteristic of polypropylenes is used to enhance the aesthetics of many flexible packages, e.g., wrappers for foods, chewing gum, and clothing. The wrappers' eye-catching appeal is considered a selling point in the retail trade. (See CONVERTING MAGAZINE, February 1992 "Extrusion Resin Review" on page 48).

Polypropylenes have one serious deficiency, however. They contain a heavy loading of stabilizers which are essential in preventing chemical, thermal, and mechanical degradation of the inherently unstable polypropylene molecules. These stabilizers further prevent the polypropylene coating surfaces from readily accepting oxidative treatment, e.g., flame impingement and/or corona discharge. Oxidizing the surface of any inert polyolefin coating is essential to its accepting printing inks. Thus, a package that uses polypropylene as its high gloss outer layer must utilize a second layer beneath the polypropylene if the package is to be printed. That second layer must be a composition, unlike polypropylene, that will readily accept oxidation to permit printing. Polyethylenes are commonly used as this second printed layer because they are chemically stable, and therefore require no stabilizers which could preclude oxidation prior to printing.

Although a polyethylene without stabilizer accepts oxidation and printing, extrusion coating grade polyethylenes do not produce coatings with a high surface gloss comparable to polypropylene. Thus the need for a glossy layer of polypropylene. Film grade polyethylenes have a somewhat better gloss than extrusion coating grade polyethylenes but are still not comparable in gloss to polypropylene, and film grade polyethylenes, with their low swell ratios, defined herein after, are not considered extrusion coatable (see for example U.S. Pat. No. 4,427,833, column 4, lines 1-5).

It would be very desirable to be able to produce a high gloss package that would contain a single "dual purpose" outer layer of a composition that would provide high gloss comparable to polypropylene, but yet accept oxidation to allow printing.

Vinyl cling films are vinyl backed photographs and/or cartoons, e.g., that can be applied to smooth surfaces such as metal or glass. These vinyl cling films are currently supported on a protective backing that is a high gloss polypropylene coated paperboard. The high gloss polypropylene surface provides an excellent cling surface for these vinyl cling films. However, these cling films dislodge or slide in a parallel motion over these smooth polypropylene surfaces. An oxidized polyethylene surface solves this sliding problem, however, the vinyl cling film does not readily cling to these polythylene surfaces since their gloss is not comparable to polypropylene. Thus, it would be very desirable to be able to have a single dual purpose outer layer for use with vinyl cling films that would provide both the high gloss surface needed for cling and the oxidized surface needed to prevent sliding or dislodgement.

SUMMARY OF THE INVENTION

The process of the present invention produces a single dual purpose high gloss polyethylene coating that comprises extrusion coating onto a substrate against a high gloss chill roll, a low density polyethylene of narrow molecular weight distribution having a melt index of 2 to 4-dg/min at 190° C., a swell ratio of 1.2 to 1.3, an annealed density of 0.92 to 0.93-g/cc, and a polydispersity index below 9.

The article of manufacture of the present invention comprises an extrusion coated product having a substrate layer and a high gloss extrusion coated layer comprised of low density polyethylene of narrow molecular weight distribution having a melt index of 2 to 4-dg/min at 190° C, a swell ratio of 1.2 to 1.3, and annealed density of 0.92 to 0.93-g/cc, and a polydispersity index below 9.

DETAILED DESCRIPTION OF THE INVENTION

The applicant has unexpectedly discovered a process for producing an extrusion coating of polyethylene having high gloss. The extrusion coated polyethylene has a surface gloss that is unexpectedly superior to that of polypropylene.

The low density polyethylene used in the process of the present invention has a narrow molecular weight distribution (MWD) as reflected in a polydispersity index below 9. The polydispersity index defined herein after is preferably between 6.0 and 7.8, more preferably between 6.5 and 7.5, with a polydispersity index of about 7 being most preferred. A polydispersity index much above 9 does not produce a coating with sufficient gloss as compared to polypropylene. However, a polydispersity index between 6.0 and 7.8 is believed sufficient to produce a coating with a surface gloss at least as good as, if not better than polypropylene.

The low density polyethylene of the present invention has a melt index of 2 to 4-dg/min at 190° C. as defined herein after. The low density polyethylene preferably has a melt index of 2.2 to 3-dg/min, with a melt index of about 2.5-dg/min being most preferred. A melt index much above 4 or much below 2, in combination with the other polymer characteristics essential to extrusion coatability, would not permit the low density polyethylene to be extrusion coatable.

The low density polyethylene of the present invention has a swell ratio of about 1.2 to 1.3, as defined herein after. The swell ratio of the low density polyethylene is more preferably about 1.25 to 1.27 with a swell ratio of about 1.26 being most preferred. A low density polyethylene with a swell ratio much above 1.3 or much below 1.2 in combination with the other polymer characteristics essential to extrusion coatability, is not extrusion coatable.

The low density polyethylene of the present invention has an annealed density of 0.92 to 0.93-g/cc as defined herein after. The low density polyethylene of the present invention preferably has an annealed density of 0.922 to 0.927-g/cc, with an annealed density of 0.926-g/cc being most preferred. Low density polyethylenes having a density much above 0.93-g/cc are not extrusion coatable due to coating uniformity problems. Low density polyethylenes having a density much below 0 92-g/cc generally have broad molecular weight distributions which result in coatings of poor gloss.

The low density polyethylene of the present invention is preferably a low density polyethylene homopolymer, however, minor mounts of other comonomers such as propylene can be present. The amount of comonomer is preferably less than 5 mole percent. The low density polyethylene of the present invention can also be blended with minor amounts of other polymers preferably not over 5 wt. % so as not to detract from the surface gloss.

Examples of suitable polyethylene materials useful in the practice of the present invention can be prepared by polymerizing relatively high purity ethylene in a stirred reactor at pressures above about 1,000 atmospheres and temperatures above about 200° C., using a peroxide type catalyst, such as, for example, di-tertiarybutyl peroxide. Lower purity ethylene containing inert materials such as methane, ethane, carbon dioxide, and the like, may be introduced into the ethylene feed to control the purity thereof. Publications to which the reader is directed for further general details on the preparation of suitable low density polyethylenes are the text Polythene by Renfrew and Morgan, at pp. 11-17 and the article in Petroleum Refiner (1956) by Thomasson, McKetta and Ponder, found at p. 191.

The process according to the present invention entails extrusion coating a substrate with the low density polyethylene against a glossy chill roll. By extrusion coating it is meant direct application after extrusion onto a substrate with subsequent quenching on a chill roll. The glossy, or high gloss, chill roll used in the present invention has a root mean square surface finish, as defined herein after, less than 10. The glossy chill roll more preferably has a root mean square surface finish of at least 1, but no more than 6, with a root mean square surface finish of no more than 2 being most preferred. A glossy chill roll is required in order to impart a glossy finish to the coating. Thus, a chill roll with a root mean square surface finish much above 10 is not glossy and would not produce a coating with a glossy surface. However, a high gloss chill roll with a root mean square surface finish near 0 or 1 is almost impossible to produce and maintain. It also would tend to cause chill roll release problems in the extrusion coating process.

The glossy chill roll surface temperature is preferably less than 20° C., but yet higher than the environmental dew point of water. A glossy chill roll surface temperature much above 20° C. permits the growth of crystals within the polymer thus detracting from a glossy finish. It is clear that the condensation of water on the chill roll would interfere with the surface finish of the coating thus the chill roll cannot be too cold.

The low density polyethylene of the present invention is preferably extruded at a temperature greater than 300° C., preferably between 300° and 340° C., with a temperature between about 310° and 340° C. being more preferred. Extrudate temperatures within this range are important to enable extrusion coating of the present invention.

The process of the present invention also preferably entails an oxidizing step wherein the resultant coated surface is oxidized under conditions sufficient to impart a level of oxidation required for the applicable end use without detracting from surface gloss. Suitable examples of oxidation processes are flame impingement, corona discharge, and ozone exposure, with corona discharge being more preferred due to cleanliness and health considerations.

The resulting extrusion coated article of the present invention preferably has a surface gloss greater than 81 as defined herein after. The surface gloss of the coating is more preferably greater than 86, with a surface gloss greater than 90 being most preferred. A surface gloss much below 81 offers no advantage over conventional extrusion coated polyethylenes.

Polyethylenes of the present invention can contain a certain additive to enhance chill roll release during extrusion coating. Suitable chill roll release additives include erucylamide, oleamide, polyethylene glycol, calcium stearate, etc. Levels of these additives are preferably less than about 0.1 wt. %.

Other additives, such as minor amounts of stabilizers, fillers and the like can be added to the composition of the present invention. Such materials can be present in the polyethylene composition or added just prior to the extrusion coating process.

Substrates contemplated for use in the practice of the present invention include papers, photographic papers, paperboards, fibers, polymeric materials, metal foils, and the like. Polymeric substrates include polyolefins or functionally modified polyolefins, polyesters or functionally modified polyesters, ethylene-vinyl alcohol copolymers or functionally modified derivatives thereof, polyamides or functionally modified polyamides, and the like including embossed and/or oriented polymeric substrates with and without microvoiding agents/pigments such as titanium dioxide, barium sulfate, and calcium carbonate.

Extruder output rates of the extrusion coating process are not critical to the present invention. Additionally, the speeds of the extrusion coating process are not critical but slower chill roll rotation speeds produce better gloss, however, production rates need to be considered.

The extrusion coating detailed techniques required to achieve high coating gloss and other variations of the present invention will be apparent to one of ordinary skill reading the present disclosure.

Experimental

In the examples the properties are determined as follows:

Melt index was determined in accordance with ASTM D1238-62T at 190° C.

Swell ratio is defined as the ratio of the diameter of the extrudate over that of the orifice diameter of the extrusion plastometer in ASTM Designation D1238-62T. The diameter of the specimen is measured in the area between 0.159 cm and 0.952 cm of the initial portion of the specimen as it emerges from the extrusion plastometer. Measurements are made by standard methods according to ASTM Designation D-374.

Annealed density was determined in accordance with ASTM D1505.

The weight-average molecular weight, Mw, number-average molecular weight, Mn, and polydispersity index, Mw/Mn, were obtained by size exclusion chromatography on a Waters 150C gel permeation chromatograph equipped with the standard refractometer detector and a Viscotek 150R differential viscometer system. The 3-column set consisted of Waters' $10^3, 10^4$, and linear-mixed bed ($10^3, 10^4, 10^5$) Micro-Styragel HT columns. The samples were run as 0.125% (wt/vol) solutions in o-dichlorobenzene at 140° C. The data was interpreted using Viscotek Unical software (V4.02), by universal calibration using NBS 1475 (linear polyethylene) and NBS 1476 (branched polyethylene) for the polyethylene samples, and a 272,000 Mw, 44,000 Mn, polypropylene standard with a polydispersity of 6.3 for the polypropylene sample:

Gloss is measured at 75° and 60° is determined in accordance with ASTM D2457. Gloss or specular reflectance of a surface is a measure of the light reflected by that surface as compared to that which would be reflected by a perfect mirror. A gloss value of 100 is 1/10 of the assigned value of 1,000 for a perfect mirror.

Root mean square defines a surface finish in accordance with American National Standard B46.1. This test is accepted by the American Society of Automotive and Mechanical Engineers.

The following examples are intended to illustrate the present invention but are not intended to limit the reasonable scope thereof.

EXAMPLES

Data for each of the following examples were obtained by, first extrusion coating each polyolefin onto SBS (Solid Bleached Sulfate) paperboard using a metal chill roll having a very glossy surface finish of 6-rms (root mean square), rotating with a surface speed of 200-fpm (about 60 meters per minute). Each polyolefin was extruded at a molten temperature of 595–600° F. (about 310–320° C.) and an output rate of 5-lb/hr/inch of die width (0.9 kg/hr/cm). After extrusion coating, but prior to winding on the take up roll, each polymer's coating surface was electronically treated to induce oxidation, then subsequently printed. Each coating surface was subjected to a 75° (from the horizontal) gloss analysis using a Gardner "Sheen" gloss meter in accordance with ASTM D2457:

EXAMPLE 1 (COMPARATIVE)

An extrusion coating grade polyethylene homopolymer, available from Eastman Chemical Company (ECC) under the trademark TENITE 1550P, having a 3.5-dg/min melt index, a swell ratio of 1.73, an annealed density of 0.918-g/cc, and a polydispersity index of 17.0 was extrusion coated and tested as indicated above. The resultant coating exhibited a surface gloss of 79.5, and its surface accepted electronic treatment and printing.

EXAMPLE 2 (COMPARATIVE)

An extrusion coating grade polyethylene homopolymer, from ECC under the trademark TENITE 1924P, having a 4.2-dg/min melt index, a swell ratio of 1.68, an annealed density of 0.925-g/cc, and a polydispersity index of 10.0 was extrusion coated and tested as indicated above. The resultant coating exhibited a surface gloss of 80.8, and its surface accepted electronic treatment and printing.

EXAMPLE 3 (COMPARATIVE)

An extrusion coating grade polypropylene homopolymer, from ECC under the trademark TENITE P-821P, having a 45-dg/min flow rate, and a polydispersity index of 6.0 was extrusion coated and tested as indicated above. The resultant coating exhibited a surface gloss of 86.8. However, its surface did not accept electronic treatment nor did it accept printing.

EXAMPLE 4

A film grade low density polyethylene homopolymer from ECC under the Trademark TENITE 1840F having the following unique properties; a 2.5-dg/min melt index, a swell ratio of 1.26, an annealed density of 0.926-g/cc, and a polydispersity index of 7.0 was extrusion coated and tested as indicated above. The resulting coating was unexpectedly uniform with no observed edge weave. The coating unexpectedly exhibited a surface gloss of 90.4, superior to the polypropylene of Example 3. The coating surface of this material accepted electronic treatment and printing, unlike polypropylene.

Pertinent properties of the polyolefins and resultant coatings along with the method of determination are illustrated below in Table I.

TABLE I

| Surface Gloss Vs Polydispersity Index Vs Swell Ratio | | | | | |
|---|---|---|---|---|---|
| Polyolefin | 75° Surface Gloss | Polydispersity Index | Swell Ratio | Mw | Mn |
| Polyethylene of Example 1 | 79.5 | 17.0 | 1.73 | 350,000 | 20,000 |
| Polyethylene of Example 2 | 80.8 | 10.0 | 1.65 | 150,000 | 15,000 |
| Polypropylene of Example 3 | 86.8 | 6.0 | — | 200,000 | 33,000 |
| Polyethylene of Example 4 | 90.4 | 7.0 | 1.26 | 140,000 | 20,000 |

Examples 1, 2, and 3 show the inverse relationship of polyolefin surface gloss to polydispersity index. One would expect that even if the polyethylene of Example 4 was extrusion coatable, its polydispersity index of 7.0 would have produced a surface gloss inferior to a polypropylene having a lower polydispersity index of 6.0. This was not the case as Example 4's surface gloss unexpectedly exceeded the superior gloss predicted for polypropylene.

Data for each of the following examples were obtained by, first extrusion coating each polyolefin onto 42-lb/ream bleached paperboard using a metal chill roll having a mirror surface finish of 2-rms, rotating with a surface speed of 600-fpm (about 150 meters/min). Each polyolefin was extruded with a molten temperature of 595–600° F. (about 310–320° C.), from a slot die with an output rate of 15-lb/hr/inch of die width (2.7 kg/hr/cm). After extrusion coating, but prior to winding, each polymer's coating surface was electronically treated to induce oxidation, then subsequently printed. Each coating surface was subjected to a 60° (from the horizontal) gloss analysis using a Gardner "Sheen" gloss meter as above: EXAMPLE 5 (COMPARATIVE)

The polyethylene homopolymer, from Example 2 was extrusion coated and tested as indicated above. The resultant coating exhibited a surface gloss of 79.0.

EXAMPLE 6

The low density polyethylene homopolymer of Example 4 was extrusion coated and tested as indicated above. The resultant coating exhibited a surface gloss of 87.8.

Examples 5 and 6 further illustrate that a coating produced according to the present invention excels in surface gloss as compared to a coating of a conventional extrusion coating grade polyethylene.

I claim:

1. An article of manufacture comprising an extrusion coated article produced according to the extrusion coating process comprising; extrusion coating onto a substrate against a glossy chill roll, a low density polyethylene having a melt index of 2 to 4-dg/min at 190° C., a swell ratio of 1.2 to 1.3, an annealed density of 0.92 to 0.93-g/cc, and a polydispersity index of 6 to 9.

2. An article of manufacture comprising an extrustion coated product having a substrate layer and a highgloss extrusion coated layer comprised of low density polyethylene having a melt index of 2 to 4-dg/min at 190° C., a swell ratio of 1.2 to 1.3, an annealed density of 0.92 to 0.93-g/cc, and a polydispersity index of 6 to 9, wherein the high gloss extrusion coated layer of polyethylene has a surface gloss greater than 81 as measured at a reflectance angle of 75° in accordance with ASTM method D2457 using a Gardner "Sheen" gloss meter.

3. The article of manufacture according to claim 2 wherein the surface gloss is greater than 86.

4. The article of manufacture according to claim 3 wherein the surface gloss is greater than 90.

5. An article of manufacture according to claim 2 wherein the low density polyethylene has a melt index of 2.2 to 3-dg/min, a swell ratio of 1.25 to 1.27, an annealed density of 0.922 to 0.927-g/cc, and a polydispersity index of 6.0 to 7.8.

6. The article of manufacture according to claim 5 wherein the low density polyethylene has a melt index of 2.5-dg/min, a swell ratio of 1.26, an annealed density of 0.926-g/cc, and a polydispersity index of about 7.

7. The article of manufacture according to claim 2 wherein the extrusion coated layer of polyethylene has an oxidized surface.

8. The article of manufacture according to claim 7 wherein the oxidized surface is an oxidized surface resulting from flame impingement, corona discharge, or ozone exposure.

9. The article of manufacture according to claim 2 wherein the low density polyethylene is a low density polyethylene homopolymer.

* * * * *